(12) United States Patent
Lutz et al.

(10) Patent No.: US 10,852,174 B2
(45) Date of Patent: Dec. 1, 2020

(54) DEVICE FOR SENSING THE PRESSURE OF A MEDIUM

(71) Applicant: Lutz Pumpen GmbH, Wertheim (DE)

(72) Inventors: Karl-Heinz Lutz, Kreuzwertheim (DE); Andrej Getze, Kreuzwertheim (DE)

(73) Assignee: Lutz Pumpen GmbH, Wertheim (DE)

(*) Notice: Subject to any disclaimer, the term of this patent is extended or adjusted under 35 U.S.C. 154(b) by 189 days.

(21) Appl. No.: 16/135,031

(22) Filed: Sep. 19, 2018

(65) Prior Publication Data
US 2019/0086252 A1 Mar. 21, 2019

(30) Foreign Application Priority Data

Sep. 20, 2017 (DE) .................. 10 2017 121 778

(51) Int. Cl.
*G01F 23/18* (2006.01)
*G01F 23/14* (2006.01)
*G01L 19/06* (2006.01)

(52) U.S. Cl.
CPC .............. *G01F 23/18* (2013.01); *G01F 23/14* (2013.01); *G01L 19/06* (2013.01)

(58) Field of Classification Search
CPC .......................... G01F 23/14–185; B67D 7/68
See application file for complete search history.

(56) References Cited

U.S. PATENT DOCUMENTS

| 4,718,824 | A | 1/1988 | Cholet et al. |
| 7,195,462 | B2 | 3/2007 | Nybo et al. |
| 9,958,308 | B2 * | 5/2018 | Murphy ................. G01F 23/14 |
| 10,562,757 | B2 * | 2/2020 | Biasi .................... B67D 1/0036 |
| 2012/0137892 | A1 | 6/2012 | Dollner et al. |
| 2015/0211526 | A1 | 7/2015 | Fastovets et al. |
| 2018/0224314 | A1 * | 8/2018 | Yoshida ............. G01F 23/0076 |

FOREIGN PATENT DOCUMENTS

| CN | 203627257 U | 6/2014 |
| DE | 36 39 455 A1 | 5/1988 |
| DE | 100 60 007 A1 | 6/2002 |
| DE | 102 26 523 A1 | 1/2004 |
| DE | 10 2004 046 266 A1 | 4/2006 |
| EP | 1 391 612 B1 | 2/2004 |

* cited by examiner

*Primary Examiner* — Juistin N Olamit
(74) *Attorney, Agent, or Firm* — Collard & Roe, P.C.

(57) ABSTRACT

A device for sensing the pressure of a medium within a fluid medium received in a container includes a pressure sensor associated with a screen or joined thereto. The screen shields the pressure sensor at least on one side from swirls formed in the medium, for example during filling or emptying of the container. The pressure sensor communicates with an external data-processing unit for evaluation of sensor data and the screen is joined to a pump lance of a container pump in the region of a pump foot and together therewith forms a measuring chamber, in which the pressure sensor is received. The pressure sensor is thereby decoupled by the screen from influences of dynamic pressure and is placed in the container in such a way that it is able to sense the pressure on the spot, but without interfering flow conditions.

11 Claims, 2 Drawing Sheets

DEVICE FOR SENSING THE PRESSURE OF A MEDIUM

CROSS REFERENCE TO RELATED APPLICATIONS

Applicant claims priority under 35 U.S.C. § 119 of German Application No. 10 2017 121 778.9 filed Sep. 20, 2017, the disclosure of which is incorporated by reference.

BACKGROUND OF THE INVENTION

1. Field of the Invention

The present invention relates to a device for sensing the pressure of a medium within a fluid medium received in a container, comprising a pressure sensor associated with a screen or joined thereto, wherein the screen shields the pressure sensor at least on one side from swirls formed in the medium, for example during filling or emptying of the container.

2. Description of the Related Art

Such a device is already known from DE 100 60 007 A1. This relates to a pressure sensor, in a fuel tank, which is intended to sense the filling level therein and is supposed to be protected by a screen from surge motions in the traveling vehicle.

Moreover, it is known from DE 106 26 523 A1 how to dispose, in a pump lance, a pressure line that possesses an opening into the conveying container at a minimum filling level. In response to a pressure decrease at a point below the minimum filling level, an external pressure sensor is able here to infer at least some information about the filling level.

DE 36 39 455 A1 relates to a fully electronic filling-level measurement of liquids and gases, for which flat pressure transducers are used.

Furthermore, EP 1 391 612 B1 describes how to determine the level of the liquid surface via a pressure sensor by means of a pressure sensor associated with a pump mechanism described therein. According to the teaching of EP 1 391 612 B1, however, a determination of the new liquid level under these conditions can take place only after each operation of the pump, not during it.

The reason for this is that the pressure sensor depends on measuring a static pressure. In order to measure the filling level of a container, the usual approach is to attempt to dispose the pressure sensor at the lowest point of the container, so that it can determine the filling level relative to this lowest point. However, this lowest point is also particularly advantageous for disposing the pump where complete emptying of the container is possible, for example in the so-called pump sump.

If one or more pump lances are now introduced into the container and begin to pump, from the immediate surroundings of the pressure sensor, the medium out of the container on which the pressure sensor is disposed, the pressure sensor will no longer be able to work under conditions suitable for it, i.e. under static pressure. To the contrary, its measured results will be greatly falsified due to the movement of the medium. This effect can be explained by means of Bernoulli's equation:

$$P_t = P_{dynamic} + P_{static}$$

If the pump is turned off, the fluid is at rest and the dynamic pressure term is zero. This special case is represented by:

$$P_t = P_{static}$$

In contrast, if the pump is turned on, the fluid in the container is set in motion. Since the resulting losses are minimal, a constant total pressure $P_t$ can be assumed, whereas the static pressure $P_{static}$ decreases during the pumping process. If a filling-level measurement as described is now performed, an erroneous filling level will be indicated due to this decrease of the static pressure.

Especially in more complex systems, in which the filling levels in containers are intended to undergo continuous monitoring, this may lead, for example, to false alarms when the pressure measurement resembles almost complete emptying of a container containing, for example, a medium that is relevant to production and critical.

SUMMARY OF THE INVENTION

Against this background, the object underlying the present invention is to provide a device for sensing the pressure of a medium within a container receiving a fluid medium that also feeds back, during the pumping process, correct measured values with respect to the filling level resulting from the static component of the pressure of the medium.

This object is achieved by a device according to the features of the invention. Further practical configurations of such a device may be inferred from the description below.

According to the invention, it is intended to ensure, around the pressure sensor, an environment that is as largely free of flow and as static as possible, so that a static pressure can be measured. For this purpose, the pressure sensor is joined to a screen, wherein in the simplest case this may be a deflector plate. The screen may have different shapes and sizes and be made of different materials, wherein the choice of material is also largely dictated by the medium. An important aspect in this connection is that the screen be selected to be large enough that it defines, within the medium, a flow-free region in which the pressure sensor is received.

In this way, the pressure sensor is shielded from flows surrounding it and is situated in at least largely static medium despite its possible proximity to the pump foot. Depending on the number and height of the wall portions surrounding the pressure sensor, a certain influence can be exerted on the static pressure component of the total pressure. However, it is also somewhat advantageous to provide one or more through openings in the screen, so that, even if the pressure sensor is surrounded in more or less complete, approximately cup-shaped manner by the screen, lowering of the level below the top edge of the screen is also able to take place therein. In this connection, a particularly preferred configuration is that the screen is open at the top and in the lower region possesses an equalizing bore as the through opening.

In a particularly preferred configuration of the invention, the screen is disposed directly on a pump lance and together with the wall thereof forms a measuring chamber, in which the pressure sensor is received. This takes place in the region of the pump foot, in order to be as close as possible to the lowest point of the container.

The sensor data are communicated to a data-processing unit, which determines the filling level from the raw data of the pressure sensor and if necessary further processes it, i.e.

adjusts it with container information, compares it with limit values and forwards the results of its calculations to process computers or interfaces.

The configuration of the measuring chamber may be subject to different requirements; somewhat advantageously, the pressure sensor may be surrounded completely by the measuring chamber, so that it is situated completely within the influence of the at least approximately purely static pressure within the measuring chamber. In addition, however, through openings may also be provided in the outer-wall portions, in order that the measurement within the measuring chamber is not completely decoupled from the container but instead the medium is able to penetrate into the measuring chamber. In particular, substantially no housing part but only the medium should be present above the pressure sensor, in order to allow the static pressure to be measured to act on the pressure sensor.

The pressure sensor itself may be joined to the data-processing unit, for example by means of a cable connection. Such a cable connection may be used in the one direction as the voltage supply for the pressure sensor, but in the opposite direction may also relay the sensor data of the pressure sensor to the data-processing unit. In such a configuration, while the pump lance is being introduced into the container, perhaps the pressure sensor may be inserted into the measuring chamber first of all, after which the cable may be guided along the pump lance to the data-processing unit.

In a further embodiment of the pump lance, the cable connection is permanently joined to the pump lance and is led out of the container in a housing running along the pump lance.

For the case that the pump mechanism is screwed together with the container opening by means of a union nut, a separate bushing to lead the cable connection out of the container is made unnecessary by such integration in the jacket of the pump lance.

Alternatively or additionally, however, the pressure sensor may also be provided with an energy store in the form of a battery or of a rechargeable accumulator. In this case, the pressure sensor will draw the energy for its operation from the energy store and additionally will be provided with wireless communication means, such as a wireless radio module, for example, such as Bluetooth or a comparable technique, for example. In this case, measured data are communicated wirelessly to the data-processing unit, in which case a cable connection is then unnecessary.

This solution may be improved by associating an induction coil as voltage supply with the pressure sensor. Therein a voltage for supplying the pressure sensor as well as for operating the wireless communication module or for charging the energy store is induced by providing the pump rotor with an exciter magnet, especially a permanent magnet. In this way, because the pump rotor is being driven in rotation by the pump motor, the pressure sensor is jointly operated by the pump rotor, without necessitating a separate cable lead.

Furthermore, in this way the pressure sensor in such a configuration is easily able to recognize whether the pump is active. This is essential when the pressure sensor is also supposed to be used to detect undesired emptying due to theft or leakage. If the filling level changes without any movement of the exciter magnet, an alarm signal can be emitted that can be evaluated and interpreted by the data-processing unit. If several pumps are being operated on the same container, a further comparison can then be made to determine whether another pump is in operation. If this is also not the case, the data-processing unit will emit an alarm.

The data-processing unit in turn may be organized in different ways. Since it is assumed within the scope of the present invention that the data-processing unit is associated only with a closed system, the association may be established with the pump mechanism, with the pump motor or with the container.

In a first case, in which the data-processing unit is joined to the container, it may possess container information on the basis of a one-time association, for example by reading an RFID chip of the container or by storage in a read-only memory of the data-processing unit. The container information may comprise data such as the volume, the filling level, possible restrictions with respect to media and so on. Since the data-processing unit remains directly on the container, these do not change without further action. If the data-processing unit now receives sensor data from the pressure sensor, these can be converted on the basis of the container information, for example from a pressure, taking the medium into consideration, into a filling level and from a filling level, taking the total volume into consideration, into a filling quantity. In particular, the leakages mentioned in the foregoing can also be appraised more accurately.

In contrast, if the data-processing unit is associated only temporarily with the container, for example on the basis of a link with the pump mechanism or with the pump motor, it is practical to read the container information. For this purpose, the data-processing unit may be provided with suitable means for reading container information.

Specifically, these means for reading container information may be means for near-field communication, with which information is read out from an information carrier within range. As an example, this may be an RFID chip, on which the container information is stored and which interacts with an RFID reader unit, for example during joining of the pump mechanism to the container. For this purpose, it is immaterial whether the RFID chip keeps all necessary container information directly in memory, or whether the RFID chip carries merely a unique identifier, on the basis of which the data-processing unit is able to procure the container information in other ways, possibly by accessing a database.

Finally, it is practical, especially in the case of a leakage alarm, when the container can be identified as quickly as possible and located rapidly. For this purpose, the pressure sensor may be provided if necessary with means for geolocation, for example for triangulation, or even for receiving and sending a GPS signal.

BRIEF DESCRIPTION OF THE DRAWINGS

The invention described in the foregoing will be explained in more detail hereinafter on the basis of an exemplary embodiment, wherein.

DETAILED DESCRIPTION OF PREFERRED EMBODIMENTS

Figure 1:
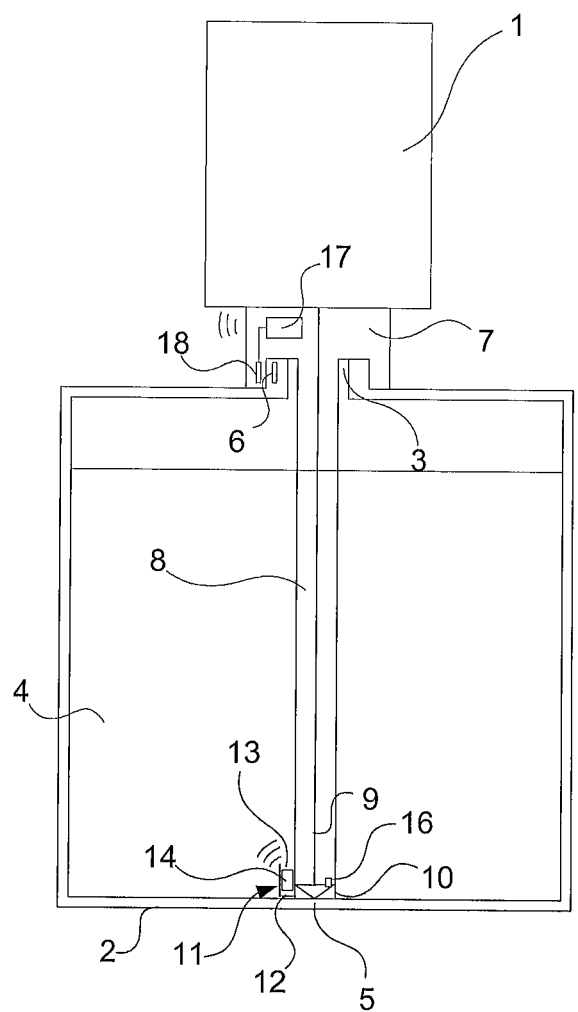
FIG. 1 shows a container in which a pump motor with pump mechanism is inserted, in a cross-sectional diagram with a wireless pressure sensor.

FIG. 1 shows a cross-sectional diagram of a container 2 for receiving fluid media. Container 2 is provided at the middle of a top side with a container opening 3, through which medium 4 can be withdrawn from container 2 or introduced into it.

A pump mechanism 7 with a pump motor 1 mounted thereon is inserted in container 2 and screwed into container opening 3 by a union nut. This pump mechanism 7 comprises not only the union nut but also a pump lance 8, which projects into container 2 up to a lowest point of container 2 that is configured as pump sump 5, for example. By operation of pump motor 1, a pump rotor 9 situated in pump lance 8 is actuated and conveys medium 4 via an outlet, not illustrated in more detail here, out of container 2.

In order to be able to determine the filling level in container 2, a pressure sensor 14, which measures the static pressure in the region of pump sump 5 in order to be able to draw conclusions therefrom on the filling level, is associated with pump lance 8 in the region of pump foot 10. For this purpose, the pressure sensor senses the static pressure around the pump foot and transmits its sensor data wirelessly via a Bluetooth link to a data-processing unit 17, which is disposed on pump mechanism 7. For this purpose, both communication partners are provided with a communication interface, via which wireless communication is possible. The voltage supply of pressure sensor 14 takes place via battery, not described in more detail here, which is charged via an induction coil, not illustrated in more detail here. As exciter in this case, an exciter magnet 16 is used, which is associated with pump rotor 9 and on the basis of its movement generates a constantly changing magnetic field.

Since a static pressure exists around pressure sensor 14 only when pump rotor 9 is stationary, pressure sensor 14 is received in a measuring chamber 11, which as a screen separates medium 4 from pressure sensor 14. Certainly measuring chamber 11 has a top open side 13 and is provided at its underside with a through opening 12, so that not only does pressure sensor 14 sense a local chamber pressure within measuring chamber 11 but also the component of the dynamic pressure, which reduces the component of the static pressure, is kept as small as possible thereby and the effects of the dynamic pressure are removed from pressure sensor 14. Hereby a reliable measurement is possible even while pump rotor 9 is running.

Since the evaluation of the sensor data of pressure sensor 14 needs further knowledge about container 2, this must be available for a suitable evaluation of data-processing unit 17. Thus this is provided with an RFID reader unit 18, which cooperates with an RFID chip 6 of container 2 and which is able to read out information during introduction of pump mechanism 7 into container 2. RFID chip 6 stores a unique identifier of container 2 or of its design type, so that data-processing unit 17 is able to procure all needed container information about container 2.

Figure 2:
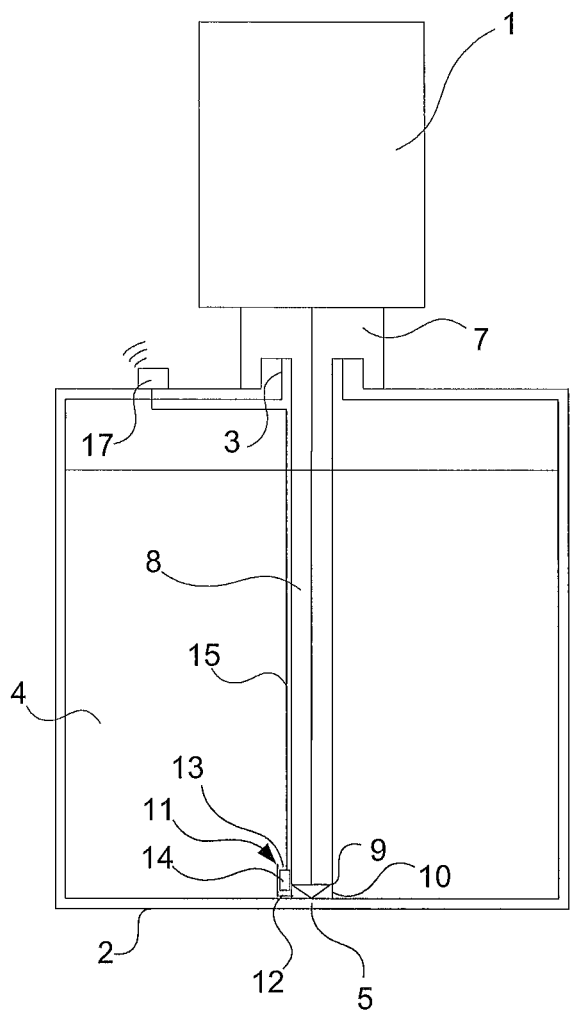
FIG. 2 shows the container according to FIG. 1 is a cross-sectional diagram with a hard-wired pressure sensor.

FIG. 2 shows a variant of FIG. 1, in which on the one hand data-processing unit 17 is associated directly with container 2 and on the other hand data-processing unit 17 communicates with pressure sensor 14 via a cable connection 15. By the fact that data-processing unit 17 is permanently joined to the container, the container information about container 2 is already stored permanently in data-processing unit 17. Thus reading of container data can be dispensed with, for example during introduction of pump mechanism 7 into container opening 3.

In contrast, cable connection 15 to pressure sensor 14 may be established during introduction of pump mechanism 7, so that pressure sensor 14 is able to communicate with data-processing unit 17 via the cable connection and is supplied with voltage from it. If necessary, cable connection 15 may be integrated directly in the jacket of pump lance 8, in order to achieve a defined routing of cable connection 15.

What is described in the foregoing is therefore a pump mechanism, which is equipped in such a way with a pressure sensor that measurement of the static pressure is possible even during pump operation. This is achieved by the fact that the pressure sensor is received in a measuring chamber and therein is shielded from swirls of the medium.

Although only a few embodiments of the present invention have been shown and described, it is to be understood that many changes and modifications may be made thereunto without departing from the spirit and scope of the invention.

LIST OF REFERENCE SYMBOLS

1 Pump motor
2 Container
3 Container opening
4 Medium
5 Pump sump
6 RFID chip
7 Pump mechanism
8 Pump lance
9 Rotating shaft with rotor
10 Pump foot
11 Measuring chamber
12 Through opening
13 Open side
14 Pressure sensor
15 Cable connection
16 Exciter magnet
17 Data-processing unit
18 RFID reader unit

What is claimed is:

1. A device for sensing the pressure of a medium within a fluid medium received in a container, comprising a pressure sensor adapted to be located in the fluid medium and associated with a screen or joined thereto;
   wherein the screen shields the pressure sensor at least on a plurality of sides from swirls formed in the fluid medium;
   wherein the pressure sensor communicates with an external data processor configured to evaluate sensor data and the pressure sensor and the screen are attached to a pump lance of a container pump in the region of a pump foot;
   wherein the screen forms a measuring chamber, in which the pressure sensor is received and which surrounds the pressure chamber at least on several sides; and
   wherein the pressure sensor is attached to an outside portion of the pump lance.

2. The device according to claim 1, wherein the screen is provided with at least one wall portion, which is perforated by at least one through opening that is passable by the medium.

3. The device according to claim 1, wherein the pressure sensor is in data communication with the data processor by means of a cable connection and/or is supplied with voltage thereby.

4. The device according to claim 3, wherein the cable connection is integrated in a jacket of the pump lance.

5. The device according to claim 1, wherein the pressure sensor is provided with an energy store and is in data communication with the data processor via a wireless communication link.

6. The device according to claim 1, wherein the pressure sensor is provided with an induction coil for a voltage supply, in which a supply voltage and/or charging voltage for an energy store of the pressure sensor is induced by an exciter magnet joined to a rotor shaft rotating in the pump lance.

7. The device according to claim 6, wherein the pressure sensor signals to the data processor that the rotor shaft is rotating to cause the exciter magnet to operate.

8. The device according to claim 1, wherein the data processor is joined to the pump lance or to an external pump motor and is provided with means for reading container information for evaluation of the sensor data of the pressure sensor.

9. The device according to claim 8, wherein the means for reading container information is a near-field communication means, which reads information from an information carrier of the container.

10. The device according to claim 9, wherein an RFID reader unit, which reads from an RFID chip, on which container information is stored, is used as the near-field communication unit.

11. The device according to claim 1, wherein the data processor is joined to the container and possesses container information for evaluation of the sensor data of the pressure sensor.

* * * * *